(12) United States Patent
Kimberlin

(10) Patent No.: US 11,926,080 B2
(45) Date of Patent: Mar. 12, 2024

(54) PUMP LINER WITH IMPROVED FIBER ORIENTATION

(71) Applicant: Procon US, Inc., Smyrna, TN (US)

(72) Inventor: Robert R. Kimberlin, Christiana, TN (US)

(73) Assignee: Procon US, Inc., Smyrna, TN (US)

( * ) Notice: Subject to any disclaimer, the term of this patent is extended or adjusted under 35 U.S.C. 154(b) by 841 days.

(21) Appl. No.: 15/405,615

(22) Filed: Jan. 13, 2017

(65) Prior Publication Data

US 2018/0200930 A1 Jul. 19, 2018

(51) Int. Cl.
| | | |
|---|---|---|
| *B29C 45/00* | (2006.01) | |
| *B29C 45/27* | (2006.01) | |
| *B29C 45/40* | (2006.01) | |
| *B29C 45/72* | (2006.01) | |
| *F04B 53/16* | (2006.01) | |
| *B29K 71/00* | (2006.01) | |
| *B29K 105/14* | (2006.01) | |
| *B29K 307/04* | (2006.01) | |
| *B29L 15/00* | (2006.01) | |
| *B29L 30/00* | (2006.01) | |

(52) U.S. Cl.
CPC ...... *B29C 45/0005* (2013.01); *B29C 45/0001* (2013.01); *B29C 45/2708* (2013.01); *B29C 45/40* (2013.01); *B29C 45/7207* (2013.01); *F04B 53/16* (2013.01); *F04B 53/166* (2013.01); *B29C 2045/2714* (2013.01); *B29K 2071/00* (2013.01); *B29K 2105/14* (2013.01); *B29K 2307/04* (2013.01); *B29L 2015/003* (2013.01); *B29L 2030/008* (2013.01)

(58) Field of Classification Search
CPC ............ B29C 45/0005; B29C 45/0001; B29C 45/7207; B29C 45/40; B29C 45/2708; B29C 2045/2714; F04B 53/166; F04B 53/16; B29K 2307/04
See application file for complete search history.

(56) References Cited

U.S. PATENT DOCUMENTS

| | | | |
|---|---|---|---|
| 4,186,161 A | 1/1980 | Ulmschneider et al. | |
| 6,171,083 B1 * | 1/2001 | Schuller ............... | B60T 8/4031 417/549 |
| 6,545,081 B1 * | 4/2003 | Nishihata ............... | C08K 3/04 428/412 |
| 6,978,886 B2 | 12/2005 | Karnes | |
| 2011/0077102 A1 * | 3/2011 | Cackett ................. | A63B 60/00 473/347 |

FOREIGN PATENT DOCUMENTS

WO 0185427 A1 11/2001

* cited by examiner

*Primary Examiner* — Monica A Huson
(74) *Attorney, Agent, or Firm* — Luedeka Neely, P.C.

(57) ABSTRACT

A molded liner member for a fluid pump is disclosed. The liner member includes a generally annular ring, having an inner surface, an outer surface which is substantially concentric with the inner surface, and first and second end surfaces. The annular ring is molded from fiber reinforced polymer, and a majority of the fiber reinforcements in the polymer are oriented substantially parallel to an axis passing through the center of the annular ring. A method for making the liner member is also disclosed.

6 Claims, 7 Drawing Sheets

PUMP LINER WITH IMPROVED FIBER ORIENTATION

FIELD

This disclosure relates to the field of fluid pump manufacture. More particularly, this disclosure relates to methods for making molded polymeric pump components, such as pump liners, having an improved degree of orientation in the molded polymer and a resultant improvement in the mechanical strength properties of the molded component.

BACKGROUND

To reduce costs associated with the manufacture of positive displacement pumps, especially those of the type used in food applications, it is sometimes desirable to fabricate various components of the pump from less expensive materials rather than more expensive materials such as brass and stainless steel. For instance, certain internal components of the pump may be fabricated from graphite, rather than metal.

While less expensive to manufacture, however, pump components made from non-metallic materials must still must still be suitable for use in under both high temperature and high pressure conditions. For instances, in food and beverage applications, internal operating temperatures and pressures for pumps may exceed 150° C. and 2.0 MPa. Under such conditions, graphite components have sometimes proved to be somewhat fragile and brittle. Graphite components may break apart under such circumstances, sending graphite shards downstream to create further damage.

Pump components manufactured from polymeric materials are another, lower-cost option. However, polymeric components have also been found to fail when subjected to the temperature and pressure conditions found in food and beverage pumps. As fluids flow through the pump, the forces exerted against the pump components may be greater in the direction of fluid flow than in other directions. These peak forces in the fluid flow direction have been found to be a particular cause of failure for non-metallic pump components.

Accordingly, what is desired is an improved method of making pump components from less expensive materials, such as molded polymers, which exhibit improved strength and mechanical properties when subjected to the temperature and pressure conditions commonly found in positive displacement pumps.

SUMMARY

The above and other needs are met a method for making a molded component according to the present disclosure, having improved fiber orientation and by a molded pump liner made in accordance with the present disclosure.

In a first aspect, the present disclosure provides a molded liner member for a fluid pump. In one embodiment, the molded liner member includes a generally annular ring, and this annular ring includes an inner surface, an outer surface which is substantially concentric with the inner surface, and first and second end surfaces. The annular ring is molded from fiber reinforced polymer, and a majority of the fiber reinforcements in the polymer are oriented substantially parallel to an axis passing through the center of the annular ring.

In certain embodiments, the fiber reinforced polymer preferably includes polyether ether ketone (PEEK). Also, in certain embodiments, the fiber reinforced polymer preferably includes from about 20% to about 50% percent carbon fibers by weight. More preferably, the fiber reinforced polymer preferably includes from about 25% to about 35% percent carbon fibers by weight. The carbon fibers preferably have an average length of from about 5 mm to about 20 mm, and more preferably have an average length of from about 10 mm to about 15 mm. Alternatively, in other embodiments, the polymer may include other types of fiber reinforcement, such as glass fibers or aramid fibers.

In certain embodiments, the first end surface of the liner member is preferably machined, and the inner surface, outer surface, and the second end surfaces are unmachined. Moreover, in some embodiments, the first end surface is preferably machined, and the inner surface, outer surface, and the second end surfaces are molded to their final shape.

Dimensionally, in certain embodiments, the inner surface preferably defines an inner diameter which is from about 350 mm to about 400 mm. The outer surface preferably defines an outer diameter which is from about 425 mm to about 475 mm.

The present disclosure also provides a fluid pump assembly which includes a pump housing and the aforementioned molded liner member, wherein the liner member is disposed within the pump housing.

In a second aspect, the present disclosure provides an injection molded article. In one embodiment, the injection molded article includes a molded body having an inner surface, an outer surface which is substantially concentric with the inner surface, and first and second end surfaces. This body is molded from fiber reinforced polymer and a majority of the fiber reinforcements in the polymer are oriented substantially parallel to an axis passing through the center of the molded body.

In certain embodiments, the injection molded article is preferably a liner for a fluid pump. In other embodiments, the injection molded article is preferably a gear, having a plurality of gear teeth molded into the outer surface.

In a third aspect, the present disclosure provides a method for making a liner member for a fluid pump. The liner member made from the method includes a generally annular ring, and this annular ring includes an inner surface, an outer surface which is substantially concentric with the inner surface, and first and second end surfaces. According to one embodiment of the method of the present disclosure, a mold tooling assembly is provided having an interior surface topography corresponding in negative to the topography of the inner surface, the outer surface, the first end surface, and the second end surface of the liner member. The mold tooling assembly also includes a port for injection of polymer positioned adjacent the center of the topography corresponding to the first end surface of the liner member. Fiber reinforced polymer is injected into the mold tooling assembly injection port at a polymer melt temperature from about 350° C. to about 400° C. The fiber reinforced polymer within the mold tooling assembly is then cooled to form a rough liner. The rough liner includes a generally annular ring having an inner surface, an outer surface which is substantially concentric with the inner surface, a first end surface, and a second end surface, and having a polymeric diaphragm gate attached to the first end surface. The rough liner is then separated from mold tooling assembly. Thereafter, the polymeric diaphragm gate is removed from the first end surface of the rough liner to provide the finished liner member. According to the method, a majority of the fiber reinforcements in the polymer of the finished liner member are oriented substantially parallel to an axis passing through the center of the finished liner member.

In certain embodiments of the method, the fiber reinforced polymer preferably includes polyether ether ketone (PEEK). Also, in certain embodiments of the method, the fiber reinforced polymer preferably includes from about 20% to about 50% percent carbon fibers by weight. More preferably, the fiber reinforced polymer preferably includes from about 25% to about 35% percent carbon fibers by weight. The carbon fibers preferably have an average length of from about 5 mm to about 20 mm, and more preferably have an average length of from about 10 mm to about 15 mm. Alternatively, in other embodiments of the method, the polymer may include other types of fiber reinforcement, such as glass fibers or aramid fibers.

In certain embodiments of the method, the fiber reinforced polymer is preferably injected into the mold tooling assembly injection port at an injection pressure from about 75 MPa to about 125 MPa. Further, in certain embodiments of the method, the fiber reinforced polymer is cooled within the mold tooling assembly to a temperature from about 350° C. to about 250° C.

Dimensionally, in certain embodiments of the method, the inner surface of the finished liner member preferably defines an inner diameter which is from about 350 mm to about 400 mm. The outer surface of the finished liner member preferably defines an outer diameter which is from about 425 mm to about 475 mm.

In a further aspect, the present disclosure also provides a liner member for a fluid pump, made according to the aforementioned method.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

The present disclosure relates to injection molded components having an improved fiber orientation and a resultant improvement in the mechanical strength properties of the injection molded components, and to methods for manufacturing such components The methods are particularly applicable to the manufacture of liner and other internal components for pumps, such as pumps for pumping water for use in beverages, such as for pumping water in carbonated water systems, for espresso machines, and beer cooling systems.

Figure 1:
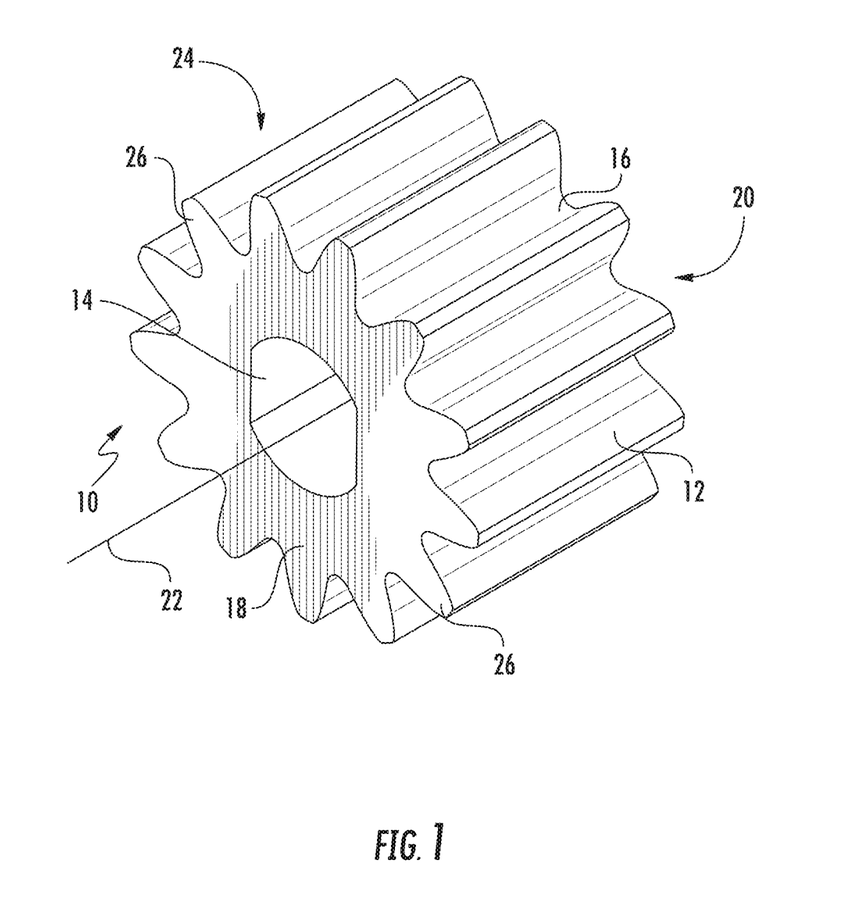
FIG. 1 is a side perspective view of an injection molded article (i.e., a gear) made in accordance with the present disclosure.

As shown in FIG. 1, an injection molded article 10 manufactured according to the present disclosure generally includes a molded body 12. This body 12 is made up of inner surface 14, an outer surface 16 which is substantially concentric with the inner surface 14, and first and second end surfaces 18, 20. This body 12 is molded from fiber reinforced polymer and a majority of the fiber reinforcements in the polymer are oriented substantially parallel to an axis 22 passing through the center of the molded body 12. In some instances, the injection molded article may be a gear 24, having a plurality of gear teeth 26 molded into the outer surface 16. In other embodiments, the injection molded article 12 is preferably an internal component for a fluid pump assembly, such as a liner for a fluid pump.

Figure 2:
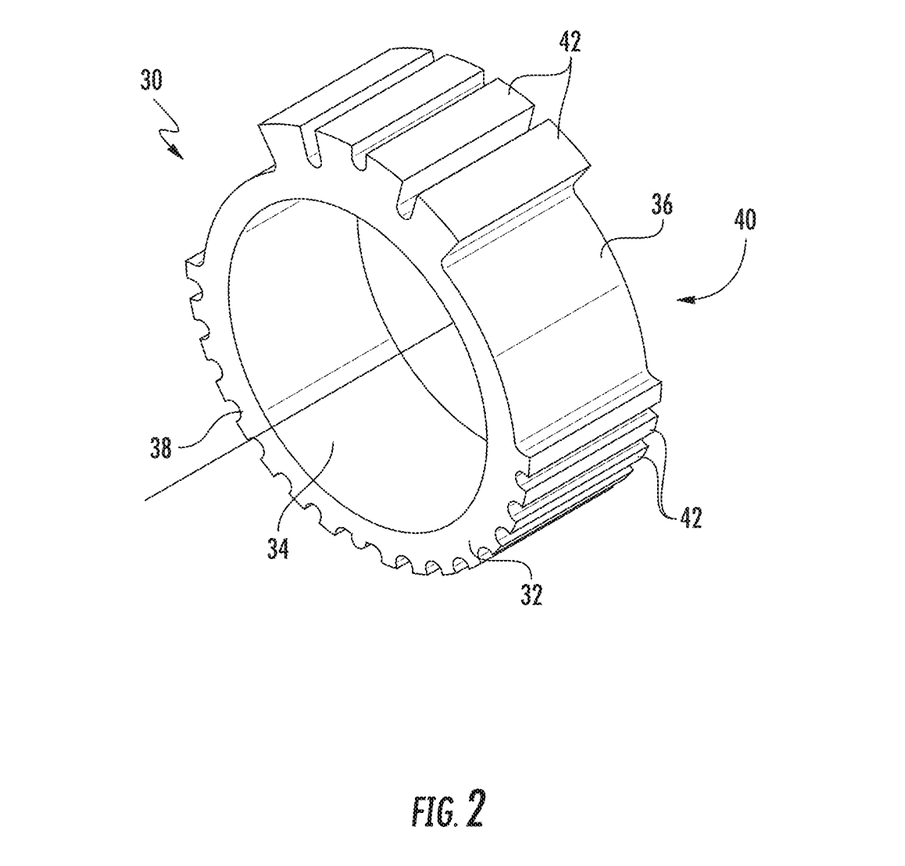
FIG. 2 is a side perspective view of a molded pump liner made in accordance with the present disclosure.

More particularly, as shown in FIG. 2, a molded liner member 30 for a fluid pump according to the present invention includes a generally annular ring 32. This annular ring 32, in turn, includes an inner surface 34, an outer surface 36 which is substantially concentric with the inner surface 34, and first and second end surfaces 38, 40. The outer surface 36 of the liner member may include one or more projections 42, such as a key or a plurality of teeth, molded into the outer surface. These will in general correspond to structures formed on the inner surface of the pump housing, and serve to maintain the pump liner in proper alignment within the pump housing.

The size of the pump liner member will vary in accordance with the overall size of the pump housing into which the liner member is to be fitted. In general, the inner surface 34 of the liner member 30 preferably defines an inner diameter which is from about 350 mm to about 450 mm. The outer surface 36 the pump liner 30 preferably defines an outer diameter which is from about 425 mm to about 475 mm.

The molded pump liner 30, or other injection molded article is molded from fiber reinforced polymer. A preferred polymer for use in molding the liner is polyether ether ketone (PEEK). Alternatively, in some embodiments, the liner may be molded from engineering grade polymers such as polyamides, polyphthalamide (PPA), polyphenylene sulfide (PPS), or a polymeric alloy of a combination of the foregoing polymers.

In addition to the aforementioned polymers, the polymeric materials used to mold the pump liner, or other article, may also include one or more additives or property modifiers, such as polytetrafluoroethylene (PTFE), carbon fibers, or aramid fibers. These additives may be present in an amount from about 5 to about 40 percent by weight.

The polymer also includes a fiber reinforcement material. Suitable fibers for this purpose include carbon fibers, glass fibers, and aramid fibers. In certain embodiments, the fiber reinforcement material most preferably is made up of carbon fibers. These fibers are generally relatively long reinforcement fibers. According to certain embodiments of the present disclosure, the reinforcement fibers preferably have an average length of from about 5 mm to about 20 mm, and more preferably have an average length of from about 10 mm to about 15 mm.

In general, in certain embodiments, the carbon or other fiber reinforcement makes up from about 20% to about 50%, by weight, of the fiber reinforced polymer. More preferably, the carbon or other fiber reinforcement makes up from about 25% to about 35%, by weight, of the fiber reinforced polymer.

As described in more detail below, a majority of the fiber reinforcements in the polymer are oriented substantially parallel to an axis passing through the center of the annular ring 32.

In certain embodiments of the pump liner member 30 or other molded article, the first end surface 38 is preferably machined in the finished pump liner or other molded article. The inner surface 34, outer surface 36, and the second end surfaces 40, however, are preferably unmachined in the finished pump liner 30 or other molded article. Rather the inner surface 34, outer surface 36, and the second end surfaces 40 are preferably molded to their final shape ("net-shape molded") in the finished pump liner or other molded article.

In this respect, "net-shape molded" means that after the liner or other component is molded it is substantially ready for use and does not require any further significant machining or shaping or polishing, such as the type typically accomplished using computer numerical controlled (CNC) equipment. In pump components intended for use in beverage or food service applications, it is generally desirable to manufacture liners and other pump internal components having as few machined surfaces as possible because post-molding machining operations leave exposed reinforcement fibers on the machined surfaces. This is to be avoided because guidelines typically associated with the use of plastics in food applications, such as those set forth by NSF International, typically limit the allowable amount of reinforcement fiber exposed to the surface of fluid wetted parts with in pump to one square inch (6.45 cm$^2$) of exposed fibers or less. Thus, as a practical matter, if significant secondary machining of a molded polymer component is required, the level of exposed fiber will usually exceed the limit.

Figure 3:
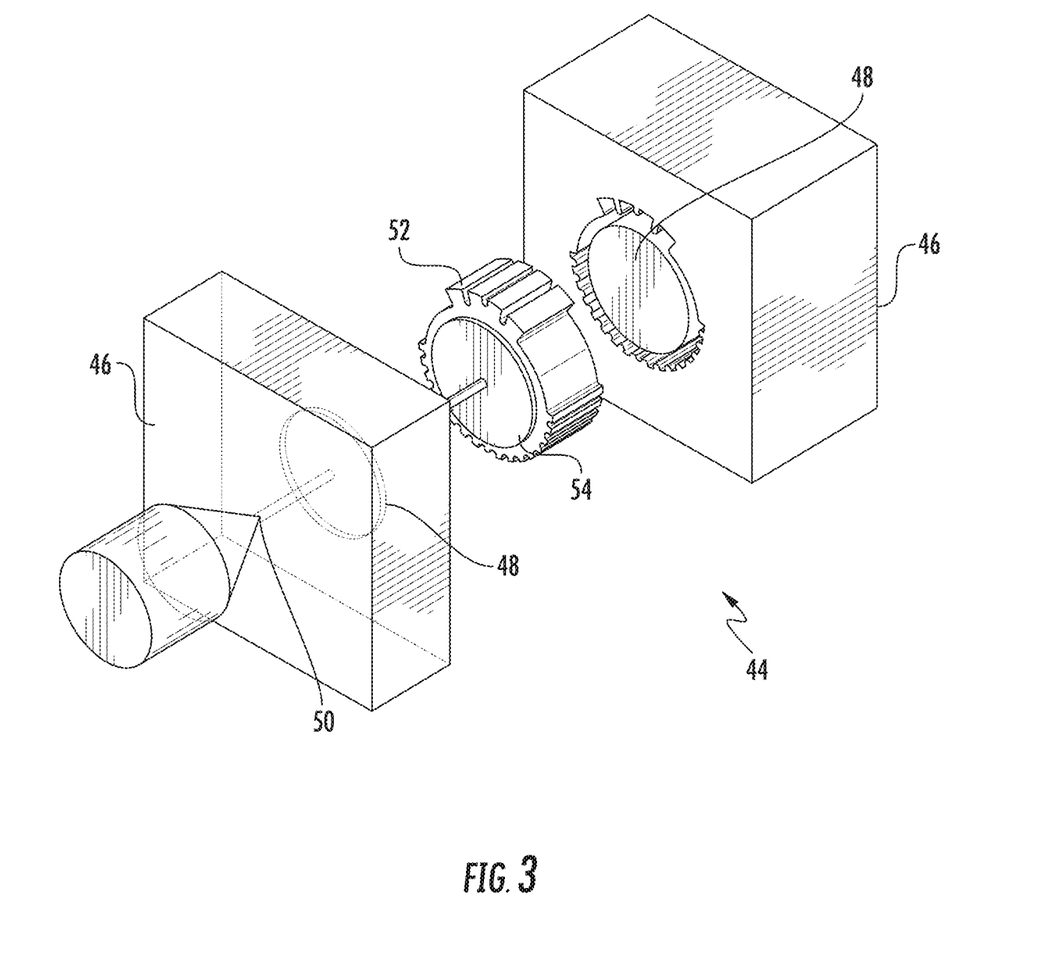
FIG. 3 is a perspective exploded view of a mold tooling assembly for use in accordance with the present disclosure.
Figure 4:
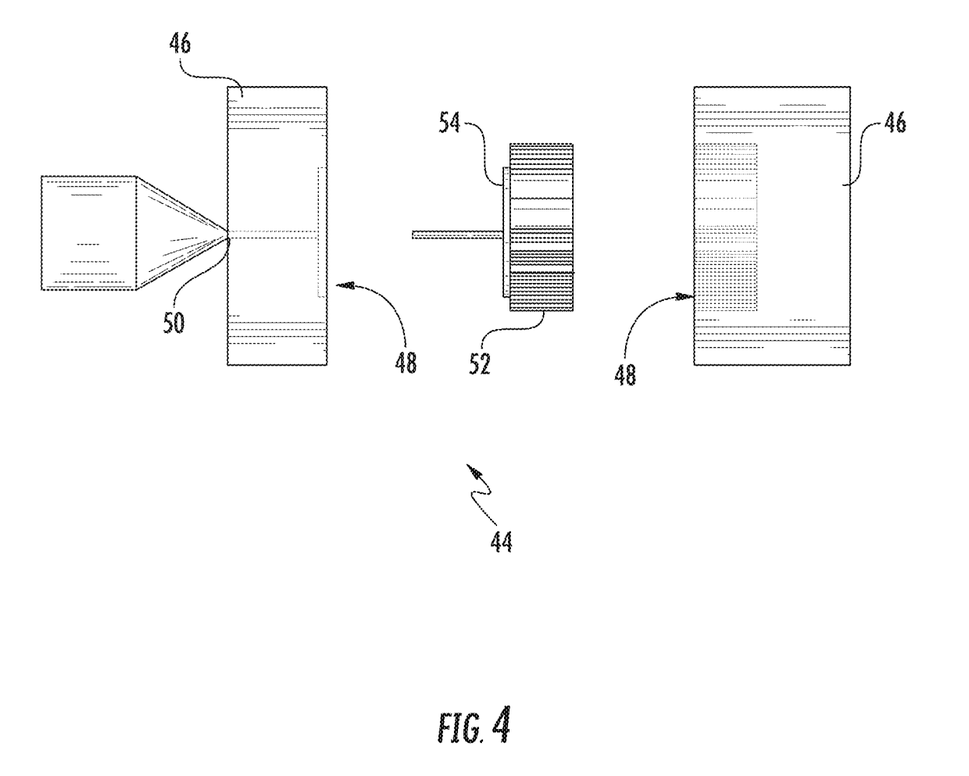
FIG. 4 is an elevational exploded view of a mold tooling assembly for use in accordance with the present disclosure.

According to the present disclosure, the pump liner member 30, or other molded component, may be manufactured by an injection molding process. As shown in FIGS. 3 and 4, a mold tooling assembly 44 is provided in which to form the molded component. The mold tooling assembly 44 may be made up of one or more individual mold and/or core elements 46. These individual mold and/or core elements 46, when assembled together, provide a mold assembly having an interior surface topography 48 corresponding in negative to the topography of the component to be molded therein. That is, for the liner member, the mold tooling assembly 44 has an interior surface topography 48 corresponding in negative to the topography of the inner surface, the outer surface, the first end surface, and the second end surface of the liner member.

The mold tooling assembly also includes a port 50 for injection of polymeric material. This injection port 50 is preferably positioned adjacent the center of the topography corresponding to the first end surface of the liner member. Thus, the polymer injection port 50 is generally aligned with an axis passing through the center of the molded liner.

Once assembled, fiber reinforced polymer is injected into the mold tooling assembly injection port 50. Before injection, the fiber reinforced polymer is preheated to a polymer melt temperature suitable for flow of the fiber reinforced polymer into the mold tooling assembly. This temperature may vary depending upon the composition of the polymer used, the type and amount of fiber reinforcement, and size and shape of the component being molded. In general, suitable melt temperatures for the injection of carbon fiber reinforced polyether ether ketone (PEEK) may range from about 350° C. to about 400° C. The fiber reinforced polymer is typically injected at an injection pressure from about 75 MPa to about 125 MPa.

Once injected into the mold tooling assembly 44, the fiber reinforced polymer within the mold tooling assembly is then cooled to form a rough liner 52. In certain embodiments of the method, the fiber reinforced polymer is cooled within the mold tooling assembly 44 to a temperature from about 350° C. to about 250° C. This temperature also may vary depending factors such as the composition of the polymer used, the type and amount of fiber reinforcement, and so forth.

Figure 6:
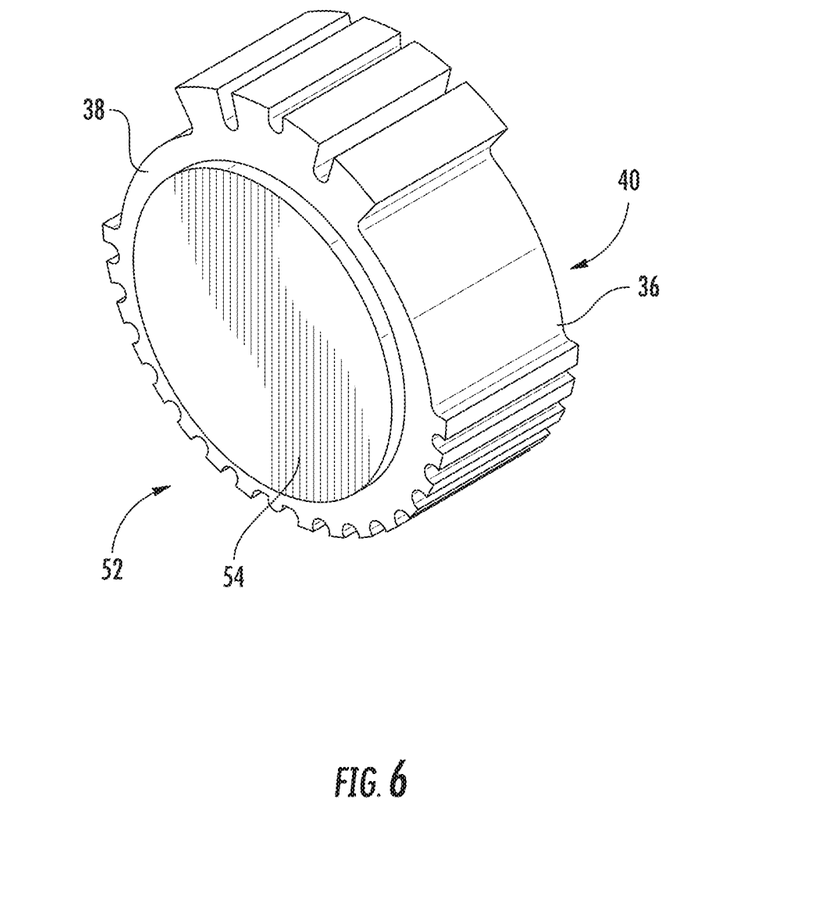
FIG. 6 is a side perspective view of a rough, unfinished pump liner made in accordance with the present disclosure.

After a period of cooling, the mold tooling assembly 44 is then opened and the rough liner 52 is then separated from mold tooling assembly 44. The rough liner 52 so formed includes a generally annular ring 32 having an inner surface 34, an outer surface 36 which is substantially concentric with the inner surface, a first end surface 38, and a second end surface 40, as shown in FIG. 6. In addition, the rough liner 52 also includes a polymeric diaphragm gate 54 attached to the first end surface 38.

According to the present disclosure, the polymeric diaphragm gate 54 is then removed from the first end surface 38 of the rough liner 52 to provide the finished liner member 30. For instance, all or a portion of the gate material may be punched out from the first end surface of the pump liner member. Thereafter, the first end surface 38 may be further machined to its final shape and dimensions, using for instance computer numerical controlled (CNC) or other suitable machining equipment.

Importantly and surprisingly, it has been found that when the pump liner 30 is formed in accordance with the foregoing method, a majority of the fiber reinforcements in the polymer of the finished liner member are oriented substantially parallel to an axis passing through the center of the finished liner member.

Figure 7:
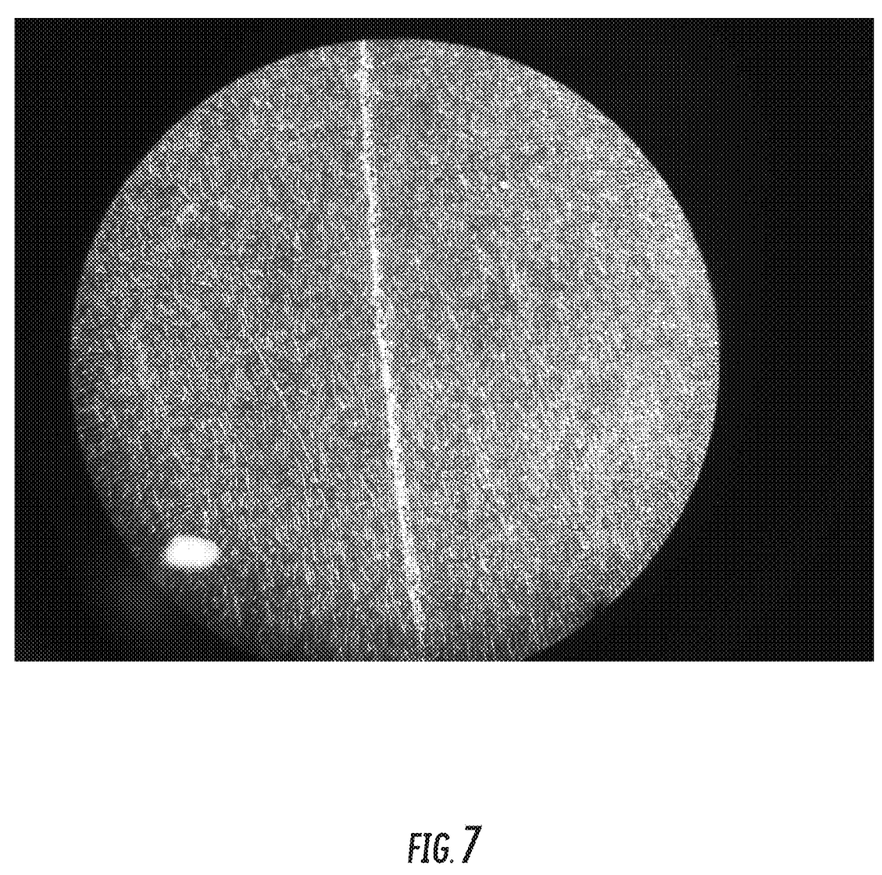
FIG. 7 is a photomicrograph of a cross-section of a fiber-reinforced polymer material, molded in accordance with the present disclosure.

The orientation of the fiber reinforcements within the molded polymer may be seen in the photomicrograph of FIG. 7. In this illustration, a cross-section of the molded fiber-reinforced polymer was photographed at a magnification of 180×. A line L was scribed across a portion of the material to indicate the direction of flow of material within the mold. It may be seen that the majority of the fiber reinforcements in polymer are generally aligned with this direction of flow. Again the achievement of this degree of fiber orientation in an article molded in this manner is unexpected and surprising.

Figure 5:
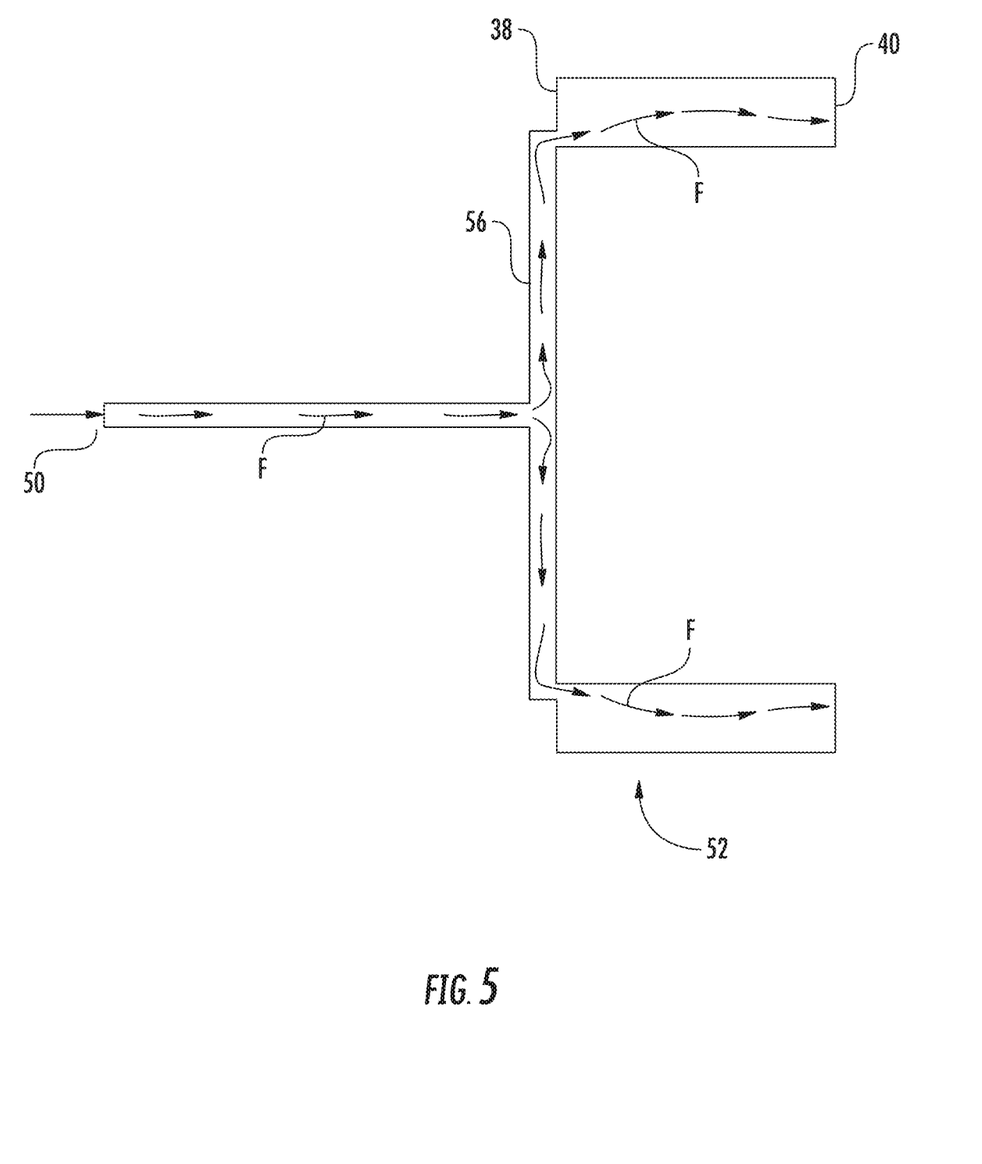
FIG. 5 is schematic view showing polymer flow within a mold tooling assembly in accordance with the present disclosure.

Without being bound by theory, it is believed that the improved orientation in the polymeric fiber reinforcements is due to the use of the diaphragm gate in the molding of the pump liner. By injecting polymer into the mold in this manner, the polymer flows in a substantially uniform manner from a central point adjacent the first end of the pump liner, outwardly to the space in the mold between the inner and outer surfaces of the pump liner, and then along the length of the pump liner from the first end to the second end, as indicated by the directional flow arrows F in FIG. 5.

By injecting the polymer in this way, and under appropriate temperature and pressure conditions, it believed that the majority of the fiber reinforcement in the polymer ends up aligned with the direction of flow of the polymer within the mold. Within the finished liner, this means that the majority fiber reinforcements in the polymer of the finished liner member are oriented substantially parallel to an axis passing through the center of the finished liner member.

This in turn has been found to lead to a substantial improvement in the strength of the molded polymer, particularly in the direction of alignment of the fibers in the molded polymer, that is, in a direction substantially parallel to an axis passing through the center of the finished liner member.

The present disclosure also provides a fluid pump assembly which includes a pump housing and the aforementioned molded liner member, wherein the liner member is disposed within the pump housing. For instance, the liner member may be disposed within the pump housing together with various other moving and static pump parts that cooperate with the housing, such as a rear cap, endplate, o-rings, bearings, seals, rotor, vanes, alignment pins, snap rings, shaft, pressure relief valve, port inserts, washers, inlet strainer, and the like. The pump housing may be coupled to an electrical or other pump motor, such as by bolts, clamps, or other fasteners.

The pump liner, as well as other components made according to the methods of the present application, are particularly well suited for pumps for pumping water for use in beverages, such as for pumping water in carbonated water systems, for espresso machines, and beer cooling systems. The pump liner of the present disclosure has been observed to exhibit improved strength and mechanical properties when subjected to the temperature and pressure conditions commonly found in positive displacement pumps, which as noted above may exceed 150° C. and 2.0 MPa.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A method for making a liner member for a fluid pump, the liner member comprising a generally annular ring having an inner surface, an outer surface which is substantially concentric with the inner surface, and first and second end surfaces, the method comprising the steps of:

providing a mold tooling assembly having an interior surface topography corresponding in negative to the topography of the inner surface, the outer surface, the first end surface, and the second end surface of the liner member, wherein the mold tooling assembly further includes a port for injection of polymer positioned adjacent the center of the topography corresponding to the first end surface of the liner member;

injecting fiber reinforced polymer comprising from about 20 to about 50 percent carbon fibers by weight into the mold tooling assembly injection port at a polymer melt temperature from about 350° C. to about 400° C., wherein the carbon fibers have an average length of from about 5 mm to about 20 mm;

cooling the fiber reinforced polymer within the mold tooling assembly to form a rough liner, the rough liner comprising a generally annular ring having an inner surface, an outer surface which is substantially concentric with the inner surface, a first end surface, and a second end surface, and having a polymeric diaphragm gate attached to the first end surface;

separating the rough liner from the mold tooling assembly; and removing the polymeric diaphragm gate from the first end surface of the rough liner to provide the finished liner member, wherein a majority of the fiber reinforcements in the polymer of the finished liner member are oriented substantially parallel to an axis passing through the center of the finished liner member.

2. The method of claim 1, wherein the fiber reinforced polymer comprises polyether ether ketone.

3. The method of claim 1, wherein the fiber reinforced polymer comprises a polymer selected from the group consisting of polyamides, polyphthalamide, polyphenylene sulfide, and mixtures thereof and is injected into the mold tooling assembly injection port at an injection pressure from about 75 MPa to about 125 MPa.

4. The method of claim 1, wherein the inner surface of the liner member defines an inner diameter which is from about 350 mm to about 400 mm.

5. The method of claim 1, wherein the outer surface of the liner member defines an outer diameter which is from about 425 mm to about 475 mm.

6. The method of claim 1, wherein the fiber reinforced polymer is cooled within the mold tooling assembly to a temperature from about 350° C. to about 250° C.

* * * * *